(12) United States Patent
Pritchard et al.

(10) Patent No.: US 9,566,857 B1
(45) Date of Patent: Feb. 14, 2017

(54) ELECTRIC DRIVE UNIT AND POWERTRAIN SYSTEM INCORPORATING THE SAME

(71) Applicant: BorgWarner Inc., Auburn Hills, MI (US)

(72) Inventors: Larry Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/830,327

(22) Filed: Aug. 19, 2015

(51) Int. Cl.
| | |
|---|---|
| *B60K 6/387* | (2007.10) |
| *B60K 6/50* | (2007.10) |
| *F16H 37/08* | (2006.01) |
| *B60K 6/365* | (2007.10) |
| *B60K 17/16* | (2006.01) |
| *B60K 17/02* | (2006.01) |

(52) U.S. Cl.
CPC ............... *B60K 6/50* (2013.01); *B60K 6/365* (2013.01); *B60K 6/387* (2013.01); *B60K 17/02* (2013.01); *B60K 17/16* (2013.01); *F16H 37/0813* (2013.01); *B60Y 2200/92* (2013.01); *B60Y 2300/188* (2013.01); *B60Y 2400/421* (2013.01); *B60Y 2400/73* (2013.01); *B60Y 2400/80* (2013.01); *Y10S 903/911* (2013.01); *Y10S 903/915* (2013.01)

(58) Field of Classification Search
CPC ........... B60K 6/54; B60K 6/365; B60K 6/387; B60K 17/02; B60K 17/16
See application file for complete search history.

(56) References Cited

U.S. PATENT DOCUMENTS

| | | | | |
|---|---|---|---|---|
| 5,845,732 | A * | 12/1998 | Taniguchi ................. | B60K 1/00 180/65.6 |
| 2007/0093341 | A1 * | 4/2007 | Supina .................... | B60K 6/365 475/5 |
| 2012/0221197 | A1 * | 8/2012 | Hisada ................. | B60H 1/3222 701/36 |
| 2014/0106921 | A1 * | 4/2014 | Mack ....................... | B60K 1/00 475/150 |

\* cited by examiner

*Primary Examiner* — Huan Le
(74) *Attorney, Agent, or Firm* — BrooksGroup

(57) ABSTRACT

An electric drive unit for a powertrain system including first and second drivelines and a primary propulsion system for translating rotational torque to the first driveline. A motor acts to generate rotational torque and a pinion is disposed in selective communication therewith. A differential is interposed between the pinion and the second driveline of for splitting torque therebetween. A first planetary is disposed between the motor and pinion, and a second planetary is disposed between the first planetary and pinion. A dog clutch interposed between the pinion and the planetaries is movable between a first position wherein torque from the motor is translated through the first planetary and the dog clutch to drive the second driveline at a first drive ratio, and a second position wherein torque from the motor is translated through both planetaries and the dog clutch to drive the second driveline at a second drive ratio.

15 Claims, 4 Drawing Sheets

ELECTRIC DRIVE UNIT AND POWERTRAIN SYSTEM INCORPORATING THE SAME

BACKGROUND OF INVENTION

1. Field of Invention

The present invention relates, generally, to automotive powertrain systems and, more specifically, to an electric drive unit for a powertrain system.

2. Description of the Related Art

Conventional automotive vehicles known in the art include a powertrain system in rotational communication with one or more drivelines. Typically, the vehicle includes a pair of drivelines, each defined by a respective pair of opposing wheels. The powertrain system includes a propulsion system adapted to generate and selectively translate rotational torque to one or more of the wheels so as to drive the vehicle. To that end, in conventional automotive powertrain systems, the propulsion system is typically realized as an internal combustion engine in rotational communication with a transmission. The engine generates rotational torque which is selectively translated to the transmission which, in turn, translates rotational torque to one or more of the drivelines. The transmission multiplies the rotational speed and torque generated by the engine through a series of predetermined gear sets, whereby changing between gear sets enables the vehicle to travel at different vehicle speeds for a given engine speed.

In order to achieve increased fuel economy and improved engine emissions, so-called "hybrid vehicle technology" has been increasingly used in powertrain systems known in the related art. In a hybrid vehicle, the propulsion system typically includes both a gas-powered internal combustion engine as well as a battery-powered electric motor, both of which cooperate with the transmission to generate and translate rotational torque to one or both vehicle drivelines. Such a hybrid vehicle propulsion system is configured to optimize the efficiency of the engine and motor, respectively, so as to minimize fuel consumption and engine emissions. In addition, the electric motor is frequently also used as a generator during vehicle braking to charge the battery, thereby further increasing efficiency and vehicle range.

With the advent of improved electric motor and battery technology, automotive vehicles in the related art also frequently include propulsion systems that omit an internal combustion engine altogether. So-called "electric vehicle" propulsion systems typically include a large electric motor in rotational communication with a transmission and/or differential which, in turn, is used to translate rotational torque to the wheels of one or both of the drivelines. Alternatively, in other types of electric vehicle powertrain systems, smaller individual electric motors are allocated to each of the driven wheels of the vehicle. Despite the increasing efficiency of electric propulsion systems in the related art, problems associated with limited driving distance and long battery charging time present barriers to widespread industry implementation of electric propulsion technology. One solution involves outfitting the electric vehicle with a "range extender," which is typically realized as a small internal combustion engine that serves purely as an electric generator and that is not in rotational communication with the propulsion system. However, implementation of a range extender is not always feasible in certain applications where vehicle weight, component packaging, and zero-emissions requirements are critical.

Each of the components and systems of the type described above must cooperate to effectively modulate translation of rotational torque to the driven wheels of the vehicle. In addition, each of the components and systems must be designed not only to facilitate improved performance and efficiency, but also so as to reduce the cost and complexity of manufacturing vehicles. While powertrain propulsion systems known in the related art have generally performed well for their intended use, there remains a need in the art for a propulsion system that has superior operational characteristics, a reduced overall packaging size, reduced parasitic losses, increased efficiency and, at the same time, that reduces the cost and complexity of manufacturing vehicles.

SUMMARY OF THE INVENTION

The present invention overcomes the disadvantages in the related art in an electric drive unit for use in a powertrain system including first and second drivelines and a primary propulsion system for translating rotational torque to the first driveline. The second driveline includes a pair of wheels. The electric drive unit includes an electric motor that acts to selectively generate rotational torque and a pinion disposed in selective rotational communication with the electric motor. A differential is interposed in torque translating relationship between the pinion and the second driveline of the powertrain system for splitting rotational torque between the pinion and the wheels of the second driveline. A first planetary gearset is disposed in selective torque translating relationship between the electric motor and the pinion. A second planetary gearset is disposed in selective torque translating relationship between the first planetary gearset and the pinion. A dog clutch assembly is interposed in torque translating relationship between the pinion and the planetary gearsets. The dog clutch assembly is movable between a first position wherein rotational torque from the electric motor is translated through the first planetary gearset and the dog clutch assembly to the pinion so as to drive the wheels of the second driveline at a first predetermined drive ratio, and a second position wherein rotational torque from the electric motor is translated through both of the planetary gearsets and the dog clutch assembly to the pinion so as to drive the wheels of the second driveline at a second predetermined drive ratio.

In addition, the present invention is directed toward a powertrain system including a first driveline having a first pair of wheels, a second driveline having a second pair of wheels, a primary propulsion system that acts to generate and translate rotational torque only to the first pair wheels of the first driveline, and an auxiliary propulsion system that acts to generate and translate rotational torque only to the second pair of wheels of the second driveline. The auxiliary propulsion system includes an electric drive unit having an electric motor that acts to selectively generate rotational torque, and a pinion disposed in selective rotational communication with the electric motor. A differential is interposed in torque translating relationship between the pinion and the second pair of wheels for splitting rotational torque between the pinion and the second pair of wheels. A first planetary gearset is disposed in selective torque translating relationship between the electric motor and the pinion. A second planetary gearset is disposed in selective torque translating relationship between the first planetary gearset and the pinion. A dog clutch assembly is interposed in torque translating relationship between the pinion and the planetary gearsets. The dog clutch assembly is movable between a first position wherein rotational torque from the electric motor is translated through the first planetary gearset and the dog clutch assembly to the pinion so as to drive the second pair of wheels at a first predetermined drive ratio, and a second position wherein rotational torque from the electric motor is translated through both of the planetary gearsets and the dog clutch assembly to the pinion so as to drive the second pair of wheels at a second predetermined drive ratio.

In this way, the electric drive unit of the present invention significantly improves the performance of vehicle powertrain systems by enabling simple and space-efficient implementation of battery-powered electric propulsion systems into vehicles. Moreover, the present invention affords opportunities for enhanced vehicle features and functionality, such as torque vectoring and regenerative braking while, at the same time, providing significant improvements in fuel economy and vehicle range, acceleration, and cornering stability. Further, the present invention can be used in connection with a number of different types of powertrain systems, and can be packaged or otherwise implemented in a number of different ways. Further still, the present invention reduces the cost and complexity of manufacturing vehicles that have superior operational characteristics, such as high efficiency, reduced weight, and improved emissions, component packaging, component life, and vehicle drivability.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
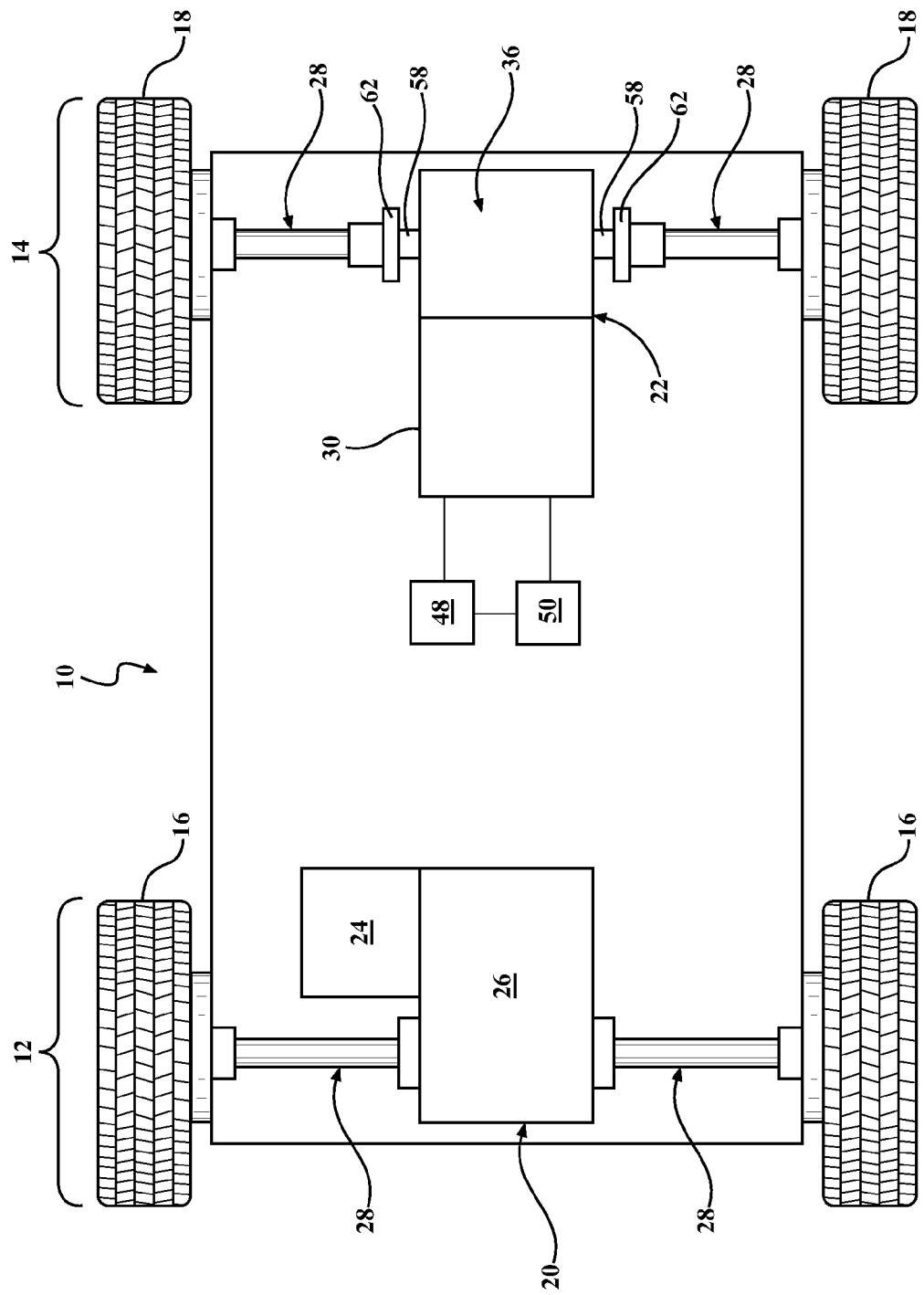
FIG. 1 is a schematic plan view of a vehicle powertrain system including an electric drive unit according to one embodiment of the present invention.

Referring now to the figures, where like numerals are used to designate like structure, a vehicle powertrain system is schematically illustrated at 10 in FIG. 1. The powertrain system 10 includes a first driveline 12 and a second driveline 14. In the representative embodiment illustrated herein, the first driveline 12 includes a first pair of opposing wheels 16, and the second driveline 14 includes a second pair of opposing wheels 18. Those having ordinary skill in the art will recognize this as a conventional "four wheeled" vehicle design commonly used in automotive applications. However, as will be appreciated from the subsequent discussion below, the vehicle could include any number of drivelines with any suitable number of wheels without departing from the scope of the present invention. The powertrain system 10 also includes a primary propulsion system 20 and an auxiliary propulsion system 22. The primary propulsion system 20 acts to generate and translate rotational torque to the first pair of wheels 16 of the first driveline 12. Similarly, and as described in greater detail below, the auxiliary propulsion system 22 acts to generate and translate rotational torque to the second pair of wheels 18 of the second driveline 14.

In the representative example illustrated in FIG. 1, the primary propulsion system 20 is realized as a convention internal combustion engine 24 in rotational communication with a transmission 26. The engine 24 generates rotational torque which is selectively translated to the transmission 26 which, in turn, translates rotational torque to the first pair of wheels 16. The transmission 26 multiplies the rotational speed and torque generated by the engine 24 and translates rotation to the wheels 16 to so as to drive the vehicle in operation. To that end, the first driveline 12 includes a pair of continuously-variable joints 28 (shown schematically) that translate rotational torque from the transmission 26 to the first pair of wheels 16. Those having ordinary skill in the art will recognize the engine 24 and transmission 26 of the primary propulsion system 20 as being of the type employed in conventional "transverse front wheel drive" powertrain systems 10. Moreover, it will be appreciated that the engine 24 and/or transmission 26 could be of any suitable type, configured in any suitable way sufficient to generate and translate rotational torque to the first driveline 12, without departing from the scope of the present invention. Further, it will be appreciated that the primary propulsion system 20 could be configured differently, or omitted entirely, without departing from the scope of the present invention. By way of non-limiting example, the primary propulsion system 20 could employ what is commonly referred to in the related art as a "hybrid engine," whereby rotational torque translated to the first driveline 12 is generated by the engine 24 as well as by one or more discrete electric motors (not shown, but generally known in the art).

As noted above, the powertrain system 10 also includes an auxiliary propulsion system 22. In the representative example illustrated in FIG. 1, the auxiliary propulsion system 20 is realized as an electric drive unit, generally indicated at 30 and according to the present invention. As will be appreciated from the subsequent description below, the electric drive unit 30 can be used in connection with any suitable type of vehicle powertrain system 10, with or without the use of a conventional internal combustion engine 24, without departing from the scope of the present invention. By way of example, it is conceivable that both the primary propulsion system 20 and the auxiliary propulsion system 22 could be realized as independent electric drive units 30. Similarly, the primary propulsion system 20 of the powertrain system 10 could be omitted entirely. Moreover, while the present invention is adapted for use with automotive passenger vehicles, it will be appreciated that electric drive unit 30 could be used in connection with any suitable type of vehicle, such as heavy-duty trucks, trains, airplanes, ships, construction vehicles or equipment, military vehicles, recreational vehicles, or any other type of vehicle that could benefit from electrically-powered torque generation.

Figure 2:
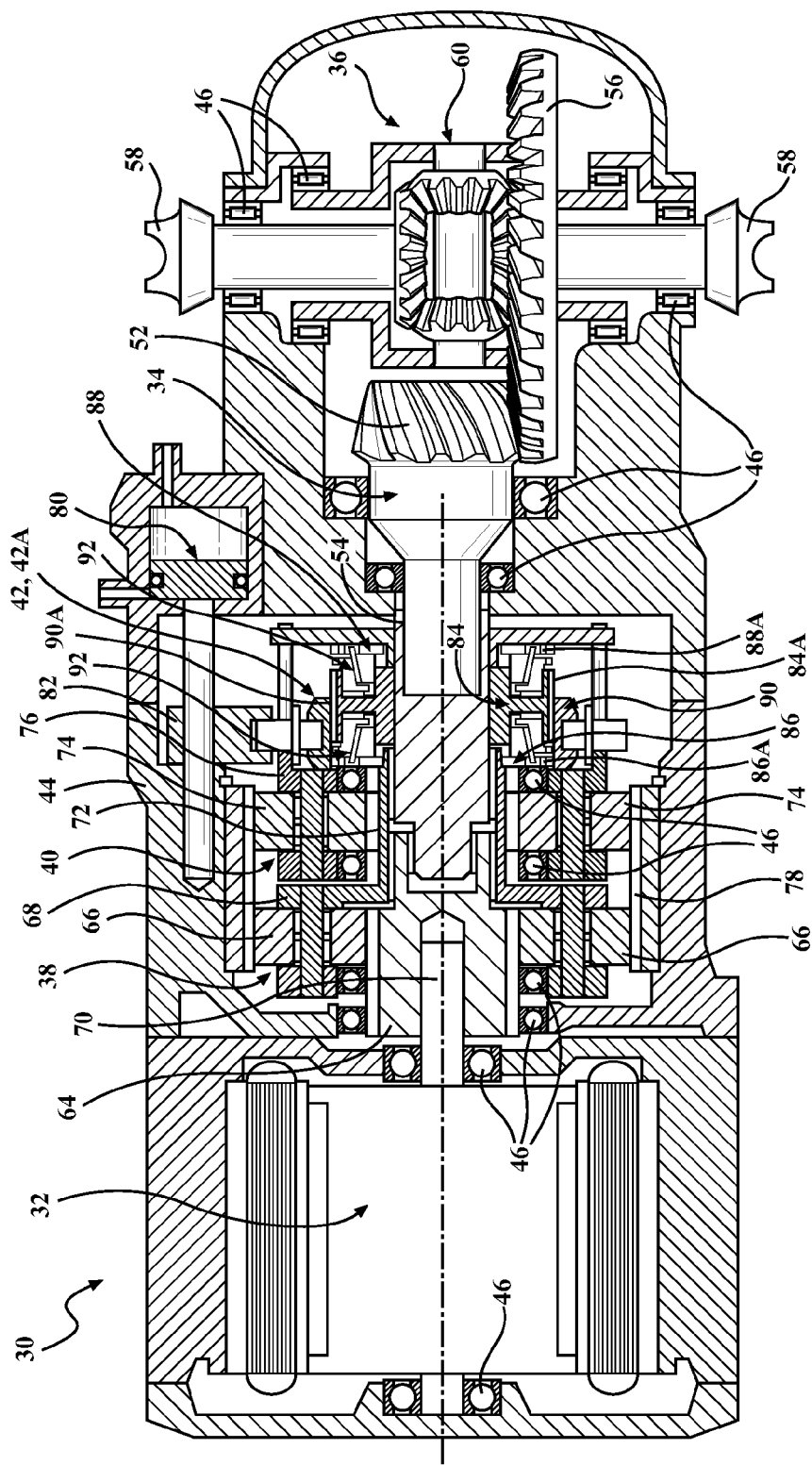
FIG. 2 is a sectional view of the electric drive unit according to one embodiment of the present invention, shown in a high-range configuration.
Figure 3:
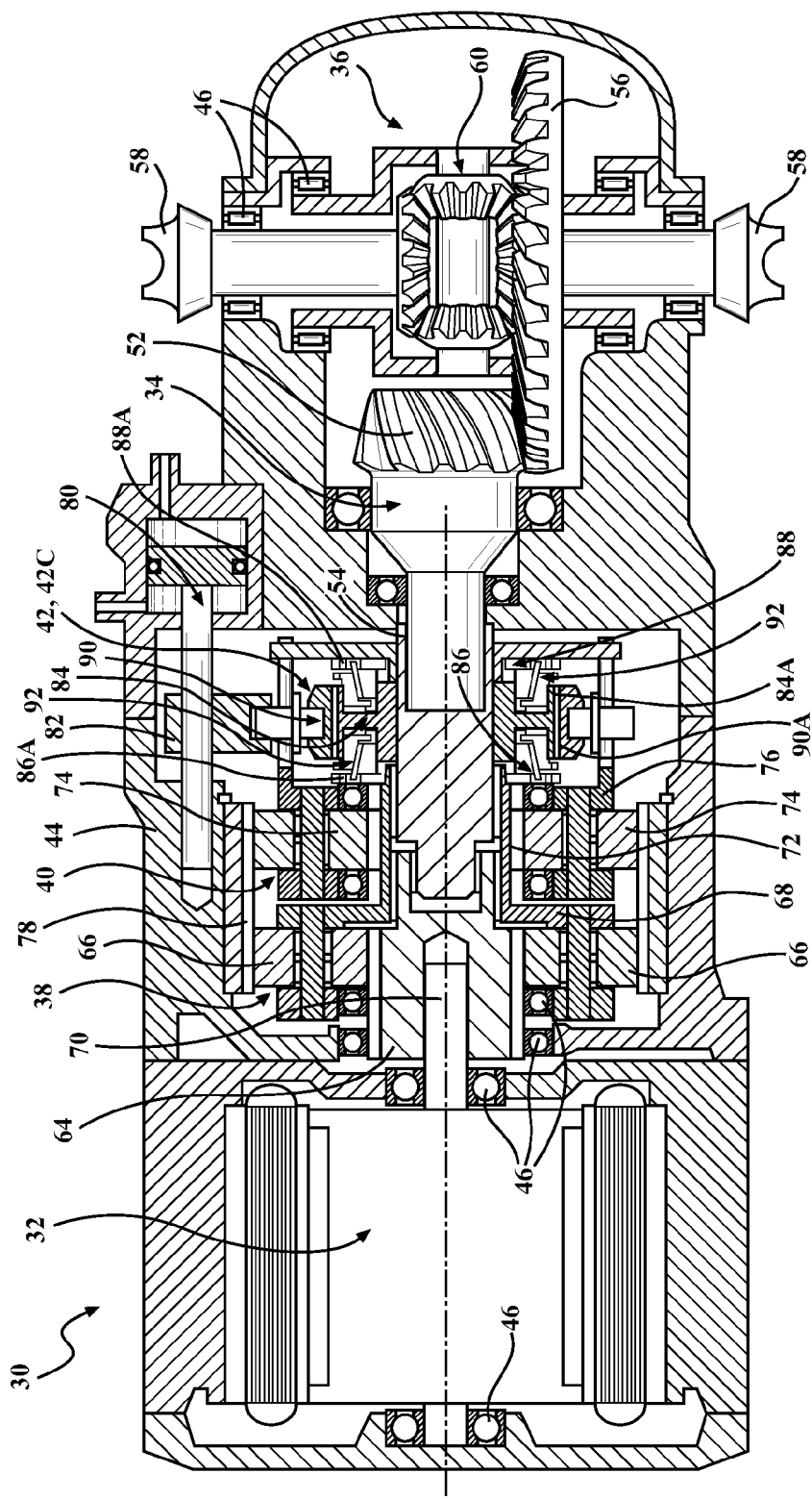
FIG. 3 is a sectional view of the electric drive unit of FIG. 2 shown in a neutral configuration.
Figure 4:
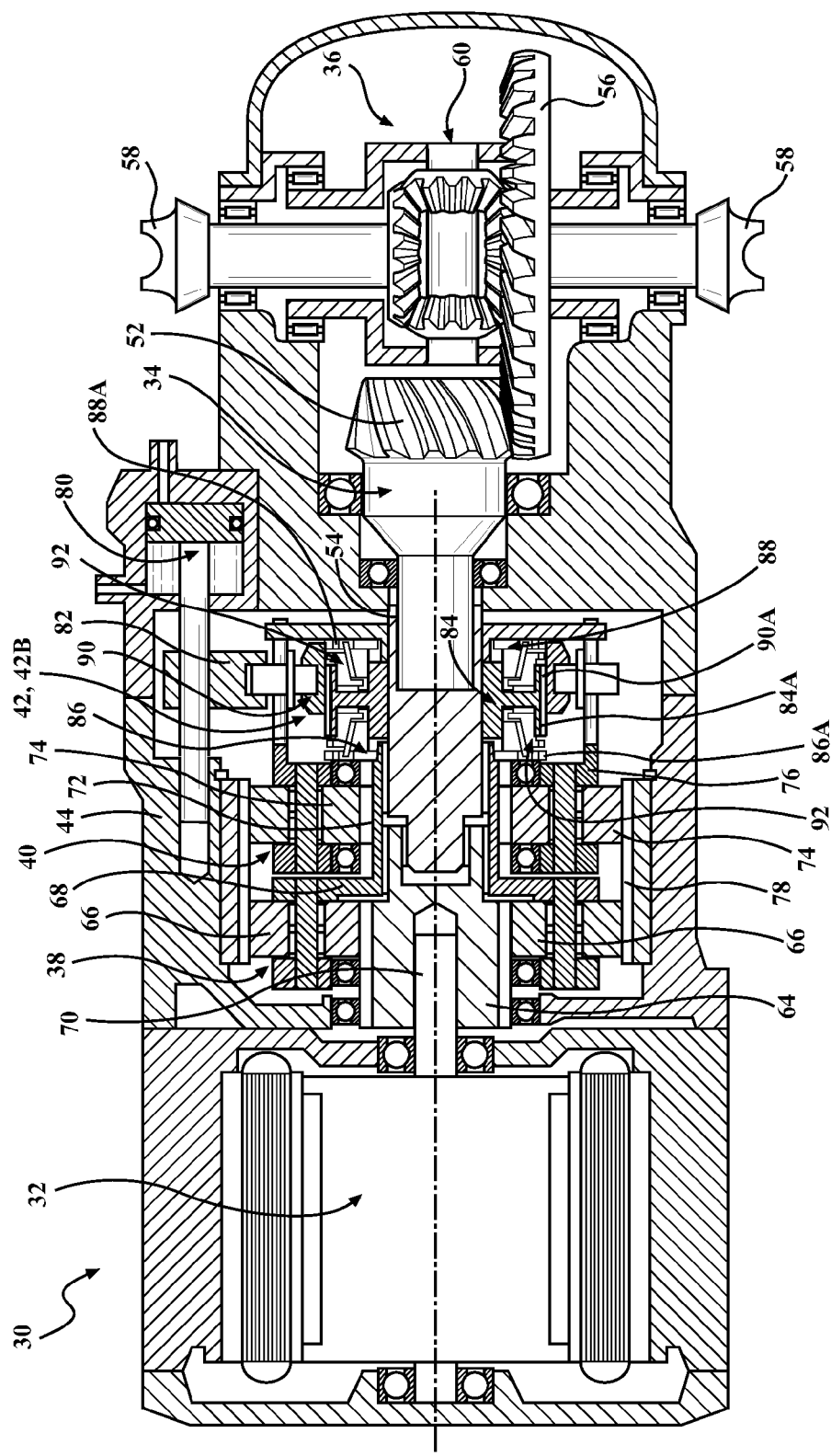
FIG. 4 is a sectional view of the electric drive unit according to one embodiment of the present invention, shown in a low-range configuration.

Referring now to FIGS. 2-4, the electric drive unit 30 of the present invention includes an electric motor 32, a pinion 34, a differential 36, a first planetary gearset 38, a second planetary gearset 40, and a dog clutch assembly 42. In the representative embodiment illustrated herein, the electric drive unit 30 also includes a main housing 44 supporting, defining, and/or operatively attached to each of these components, as described in greater detail below.

The electric motor 32 is supported in the main housing 44, such as by one or more bearings, generically indicated at 46 (see FIG. 2). The electric motor 32 acts to selectively generate rotational torque used to drive the second pair of wheels 18 of the second driveline 14, as described in greater detail below. To that end, and in one embodiment of the present invention, the auxiliary propulsion system 22 includes a battery 48 and a controller 50 both in electrical communication with the electric drive unit 30 (see FIG. 1). The battery 48 is used to power the electric motor 32 in operation and may be of any suitable type, size, or configuration. The controller 50, sometimes referred to in the related art as an "electronic control module," is in electrical communication with the electric motor 32, and may be configured to modulate, actuate, or otherwise control the dog clutch assembly 42 so as to control translation of rotational torque between the electric motor 32 and the second pair of wheels 18, as described in greater detail below. Advantageously, the auxiliary propulsion system 22 may be configured so that the electric motor 32 also functions as a generator used to charge the battery 48, such as by regenerative breaking. Moreover, is also conceivable that the battery 48 could be charged while the vehicle is parked, using so-called "plug-in hybrid" technology known in the related art.

It will be appreciated that the electric motor 32 could be of any suitable type or configuration sufficient to generate rotational torque using power from the battery 48 without departing from the scope of the present invention. By way of non-limiting example, it is conceivable that the electric motor 32 could be realized as a DC traction motor or an AC induction motor. As will be appreciated from the subsequent description below, the specific configuration of the electric motor 32 may be determined based on specific operational requirements of the powertrain system 10, such as vehicle speed, curb weight, payload capacity, operating environment, etc.

As noted above, the electric drive unit 30 includes a pinion 34 disposed in selective rotational communication with the electric motor 32. The pinion 34 is supported in the main housing 44, such as by one or more bearings 46 (see FIG. 2). More specifically, the pinion 34 includes a pinion gear 52 and a pinion shaft 54. The pinion shaft 54 is coupled to and rotates with the pinion gear 52 and is disposed in selective rotational communication with the dog clutch assembly 42. The pinion gear 52 is disposed in meshing engagement with the differential 36 so as to translate rotational torque between the electric motor 32 and the wheels 18 of the second driveline 14. To that end, the differential 36 is interposed in torque translating relationship between the pinion 34 and the second driveline 14 of the powertrain system 10 for splitting rotational torque between the pinion 34 and the wheels 18 of the second driveline 14. More specifically, the differential 36 includes a ring 56, a pair of output shafts 58, and a differential subassembly, generally indicated at 60. The ring 56 is supported in meshing engagement with the pinion gear 52. Thus, the ring 56 is supported in rotational communication with the pinion 34. Similarly, the outputs 58 of the differential 36 are each rotatably supported in the differential 36, such as by bearings 46 (see FIG. 2), and are each disposed in rotational communication with one of the wheels 18 of the second driveline 14. To that end, in one embodiment, the electric drive unit 30 includes an output flange 62 operatively attached to each of the output shafts 58 of the differential 36 (see FIG. 1). The output flanges 62 facilitate simple connection to the second pair of wheels 18, such as by another set of continuously-variable joints 28. However, those having ordinary skill in the art will appreciate that the electric drive unit 30 could be designed in any suitable way sufficient to translate rotational torque from the output shafts 58 to the second pair of wheels 18 of the second driveline 14, with or without the use of output flanges 62, without departing from the scope of the present invention.

The differential subassembly 60 is also rotatably supported by the differential 36, such as by bearings 46 (see FIG. 2), and is used to split rotational torque between the ring 56 and the output shafts 58, as noted above. While the differential subassembly 60 illustrated herein is of a conventional configuration and utilizes an arrangement of bevel gears to split torque between the wheels 18 of the second driveline 14 (not shown in detail, but generally known in the art), those having ordinary skill in the art will appreciated that the differential subassembly 60 could be of any suitable type or configuration sufficient to split rotational torque between the pinion 34 and the wheels 18 of the second driveline 14 without departing from the scope of the present invention. By way of non-limiting example, the differential 36 could be of a so-called "limited-slip" configuration utilizing what is commonly referred to as "torque sensing" gears and/or and arrangement of one or more frictional clutch assemblies to control torque split between the wheels 18 of the second driveline 14 in a predetermined or selectively adjustable manner (not shown, but generally known in the related art).

As noted above, the electric drive unit 30 also includes a pair of planetary gearsets 38, 40. The first planetary gearset 38 is disposed in selective torque translating relationship between the electric motor 32 and the pinion 34. Similarly, the second planetary gearset 40 is disposed in selective torque translating relationship between the first planetary gearset 38 and the pinion 34. Further, the dog clutch assembly 42 is interposed in torque translating relationship between the pinion 34 and the planetary gearsets 38, 40. The dog clutch assembly 42 is selectively movable between a first position 42A (see FIG. 2) and a second position 42B (see FIG. 4). In one embodiment, the dog clutch assembly 42 is also selectively movable to a third position 42C (see FIG. 3), as described in greater detail below. When the dog clutch assembly 42 is in the first position 42A (see FIG. 2), rotational torque from the electric motor 32 is translated through the first planetary gearset 38 and the dog clutch assembly 42 to the pinion 34 so as to drive the wheels 18 of the second driveline 14 at a first predetermined drive ratio DR1, as described in greater detail below. Conversely, when the dog clutch assembly 42 is in the second position 42B (see FIG. 4), rotational torque from the electric motor 32 is translated through both of the planetary gearsets 38, 40 and also through the dog clutch assembly 42 to the pinion 34 so as to drive the wheels 18 of the second driveline 14 at a second predetermined drive ratio DR2, as described in greater detail below.

The first planetary gearset 38 includes a first sun gear 64, a plurality of first planet gears 66 disposed in meshing relationship with the first sun gear 64, and a first carrier 68 supporting the first planet gears 66. The first carrier 68 rotates concurrently with the pinion 34 when the dog clutch assembly 42 is in the first position 42A (see FIG. 2). In one embodiment, the electric motor 32 includes a motor output shaft, generally indicated at 70, which is operatively attached to the first sun gear 64 of the first planetary gearset 38, such as with a keyed engagement therebetween (not shown in detail, but generally known in the related art). Thus, the output shaft 70 of the electric motor 32 is coupled to and rotates concurrently with the first sun gear 64 of the first planetary gearset 38. However, those having ordinary skill in the art will appreciate that the first sun gear 64 could be operatively attached the electric motor 32 in any suitable way without departing from the scope of the present invention. Moreover, it will be appreciated that the first planetary gearset 38 could be configured in a number of different ways sufficient to selectively translate rotational torque between the electric motor 32 and the pinion 34, as noted above, without departing from the scope of the present invention.

In one embodiment, the second planetary gearset 40 includes a second sun gear 72, a plurality of second planet gears 74 disposed in meshing relationship with the second sun gear 72, and a second carrier 76 supporting the second planet gears 74. The second carrier 76 rotates concurrently with the pinion 34 when the dog clutch assembly 42 is in the second position 42B (see FIG. 4). It will be appreciated that the second planetary gearset 40 could be configured in a number of different ways sufficient to selectively translate rotational torque between the first planetary gearset 38 and the pinion 34, as noted above, without departing from the scope of the present invention.

In the representative embodiment of the electric drive unit 30 depicted in FIGS. 2-4, the second sun gear 72 of the second planetary gearset 40 is integrally formed with the first carrier 68 of the first planetary gearset 38. It will be appreciated that this configuration advantageously optimizes the overall packaging size of the electric drive unit 30 and contributes to simplified component assembly during manufacturing. Similarly, in one embodiment, the first planetary gearset 38 and the second planetary gearset 40 are both supported in meshing engagement with a common ring gear 78 which, in turn, is supported in the main housing 44, thereby further simplifying the complexity of assembling the electric drive unit 30. However, those having ordinary skill in the art will appreciate that the planetary gearsets 38, 40 could be arranged or otherwise configured in any suitable way sufficient to cooperate with the dog clutch assembly 42 so as to effect selective translation of rotational torque between the electric motor 32 and the pinion 34, as noted above, without departing from the scope of the present invention.

It will be appreciated that the planetary gearsets 38, 40 and the differential 36 can each be configured so as to adjust the rotational speed and/or torque generated by the electric motor 32 so as to effect translation of rotational torque to the wheels 18 of the second driveline 14 such that particularly advantageous electric motor 32 operating conditions can be utilized under certain predetermined vehicle operating conditions, thereby optimizing the efficiency of the entire powertrain system 10. Specifically, the ring 56 of the differential 36 and the pinion gear 52 of the pinion 34 define a differential reduction gear ratio GRD, the first sun gear 64 and the first planet gears 66 of the first planetary gearset 38 define a first reduction gear ratio GR1, and the second sun gear 72 and the second planet gears 74 of the second planetary gearset 40 define a second reduction gear ration GR2. The first drive ratio DR1 is equal to the product of the differential reduction gear ratio GRD and the first reduction gear ratio GR1. Expressed differently, DR1=GRD*GR1. Similarly, the second drive ratio DR2 is equal to the product of the differential reduction gear ratio GRD, the first reduction gear ratio GR1, and the second reduction gear ration GR2. Expressed differently, DR2=GRD*GR1*GR2. Thus, these ratios can be adjusted depending on the application of the powertrain system 10, whereby different ratios may be implemented for vehicles with different requirements in terms of weight, top speed, acceleration, and the like. The inventors have found that a first reduction gear ratio GR1 of between 2.6:1 and 5.0:1, a second reduction gear ratio GR2 of between 2.6:1 and 5.0:1, and a differential reduction gear ratio of between 2.5:1 and 4.0:1 are particularly advantageous for powertrain systems 10 implemented in connection with automotive passenger vehicle powertrain systems 10, in that substantial compromise is achieved between overall component size and packaging complexity, vehicle speed and payload capacity, and efficient motor operating range utilization. In one embodiment, the first reduction gear ratio GR1 is equal to the second reduction gear ratio GR2. Expressed differently, GR1=GR2.

It will be appreciated that the configuration of the drive ratios DR1, DR2 described above effect selective operation of the electric drive unit 30 between a so-called "high range" when the dog clutch assembly 42 is in the first position 42A (see FIG. 2) and a "low range" when the dog clutch assembly 42 is in the second position 42B (see FIG. 4). As noted above, in one embodiment, the dog clutch assembly 42 is also selectively movable to a third position 42C, wherein rotational torque is interrupted between the electric motor 32 and the pinion 34 (see FIG. 3). Those having ordinary skill in the art will appreciate that interruption between the electric motor 32 and pinion 34 defines a so-called "neutral" or "free-wheel" configuration which may be advantageously implemented in certain types of powertrain systems 10, such as those utilizing a DC traction motor configuration for the electric motor 32 whereby the third position 42C can be utilized to increase the efficiency of the second driveline 14 by reducing counter-electromotive force (sometimes referred to in the related art as "back EMF") at relatively high vehicle speeds or during other predetermined vehicle operating conditions. However, those having ordinary skill in the art will appreciate that the dog clutch assembly 42 could be realized without a discrete third position 42C, depending on the specific requirements of the powertrain system 10, without departing from the scope of the present invention.

In order to effect movement of the dog clutch assembly 42 between the positions 42A, 42B, 42C, the electric drive unit 30 may include an actuator, generally indicated at 80. As illustrated in FIGS. 2-4, the actuator 80 is supported within the main housing 44 and is used to move a slider 82 which, in turn, moves the dog clutch assembly 42 between the positions 42A, 42B, 42C. In the representative embodiment illustrated throughout the figures, the actuator 80 is realized as a ram actuated such as via pressurized hydraulic fluid (not shown in detail, but generally known in the related art). However, those having ordinary skill in the art will appreciate that the actuator 80 could be of any suitable type or configuration sufficient to move the dog clutch assembly 42 between the positions 42A, 42B, 42C, without departing from the scope of the present invention. By way of non-limiting example, the actuator 80 could be an electric linear actuator driven via the controller 50 (see FIG. 1; not shown in detail, but generally known in the related art).

As noted above, selective actuation of the actuator 80 urges the slider 82 which, in turn, moves the dog clutch assembly 42 between the positions 42A, 42B, 42C. To that end, in one embodiment, the dog clutch assembly 42 includes an interface coupling 84, a first engagement coupling 86, a second engagement coupling 88, and a collar assembly 90. The interface coupling 84 is operatively attached to and rotates concurrently with the pinion shaft 54. The collar assembly 90 is operatively attached to and moves concurrently with the slider 82 (compare FIGS. 2-4). The first engagement coupling 86 is operatively attached to and rotates concurrently with the first carrier 68 of the first planetary gearset 38. Similarly, the second engagement coupling 88 is operatively attached to and rotates concurrently with the second carrier 76 of the second planetary gearset 40. The collar assembly 90 has an inner tooth arrangement, generally indicated at 90A, and the couplings 84, 86, 88 each have an outer tooth arrangement, generally indicated at 84A, 86A, 88A, respectively. The inner tooth arrangement 90A of the collar assembly 90 is meshed with and travels along the outer tooth arrangement 84A of the interface coupling 84 as the slider 82 moves between the positions 42A, 42B, 42C. When the slider 82 moves the dog clutch assembly 42 to the first position 42A, the inner tooth arrangement 90A of the collar 90 simultaneously engages the outer tooth arrangement 84A of the interface coupling 84 and the outer tooth arrangement 86A of the first engagement coupling 86 (see FIG. 2). Similarly, when the slider 82 moves the dog clutch assembly 42 to the second position 42B, the inner tooth arrangement 90A of the collar 90 simultaneously engages the outer tooth arrangement 84A of the interface coupling 84 and the outer tooth arrangement 88A of the second engagement coupling 88 (see FIG. 4). Further, when the slider 82 moves the dog clutch assembly 42 to the third position 42C, the inner tooth arrangement 90A of the collar 90 engages the outer tooth arrangement 84A of the interface coupling 84 and is spaced from both the outer tooth arrangement 86A of the first engagement coupling 86 and the outer tooth arrangement 88A of the second engagement coupling 88 (see FIG. 3). Those having ordinary skill in the art will recognize that the dog clutch assembly 42 described herein translates rotational torque between the pinion 34 and the planetary gearsets 38, 42 via interference engagement of the tooth arrangements 84A, 86A, 88A, 90A. This configuration significantly avoids frictional parasitic losses in operation and contributes to increased efficiency of the electric drive unit 30. Further, it will be appreciated that the dog clutch assembly 42 could be supported, configured, or otherwise oriented in a number of different ways, utilizing any suitable arrangement or combination of components sufficient to effect selective translation of rotational torque between the pinion 34 and the planetary gearsets 38, 42 via interference engagement, without departing from the scope of the present invention. In one embodiment, each of the engagement couplings 86, 88 includes a synchro, generally indicated at 92, for facilitating smooth engagement with the collar 90 as the slider 82 moves the dog clutch assembly 42 between positions 42A, 42B, 42C (not shown in detail, but generally known in the art).

In this way, the electric drive unit 30 and powertrain system 10 of the present invention significantly improves the performance of vehicles by enabling simple and space-efficient implementation of battery-powered electric auxiliary propulsion systems 22. Specifically, it will be appreciated that the present invention allows vehicles to benefit from advantages traditionally reserved for hybrid or electric vehicles, such as regenerative breaking and responsive torque availability at a broad range of vehicle operating speeds. Thus, an otherwise conventional "front-wheel-drive" vehicle with an internal combustion engine 24 can be outfitted with the electric drive unit 30 according to the present invention in a simple and cost effect manner while, at the same time, providing significant improvements in fuel economy/range, acceleration, traction, and "four-wheel-drive" functionality. Further, the electric drive unit 30 and powertrain system 10 of the present invention reduce the cost and complexity of manufacturing vehicles that have superior operational characteristics, such as high efficiency, reduced weight, and improved emissions, component packaging, component life, and vehicle drivability.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An electric drive unit for use in a powertrain system including first and second drivelines and a primary propulsion system for translating rotational torque to the first driveline, the second driveline including a pair of wheels, said electric drive unit comprising:
   an electric motor that acts to selectively generate rotational torque;
   a pinion disposed in selective rotational communication with said electric motor;
   a differential interposed in torque translating relationship between said pinion and the second driveline of the powertrain system for splitting rotational torque between said pinion and the wheels of the second driveline;
   a first planetary gearset disposed in selective torque translating relationship between said electric motor and said pinion;
   a second planetary gearset disposed in selective torque translating relationship between said first planetary gearset and said pinion; and
   a dog clutch assembly interposed in torque translating relationship between said pinion and said planetary gearsets, wherein said dog clutch assembly is movable between a first position wherein rotational torque from said electric motor is translated through said first planetary gearset and said dog clutch assembly to said pinion so as to drive the wheels of the second driveline at a first predetermined drive ratio, and a second position wherein rotational torque from said electric motor is translated through both of said planetary gearsets and said dog clutch assembly to said pinion so as to drive the wheels of the second driveline at a second predetermined drive ratio.

2. The electric drive unit as set forth in claim 1, further including a common ring gear supporting said first planetary gearset and said second planetary gearset.

3. The electric drive unit as set forth in claim 1, wherein said dog clutch assembly is selectively movable to a third position wherein rotational torque is interrupted between said electric motor and said pinion.

4. The electric drive unit as set forth in claim 1, further including an actuator for selectively moving said dog clutch assembly between said first position and said second position.

5. The electric drive unit as set forth in claim 1, wherein said first planetary gearset includes a first sun gear, a plurality of first planet gears disposed in meshing relationship with said first sun gear, and a first carrier supporting said first planet gears; and wherein said first carrier rotates concurrently with said pinion when said dog clutch assembly is in said first position.

6. The electric drive unit as set forth in claim 5, wherein said first sun gear is operatively attached to said electric motor.

7. The electric drive unit as set forth in claim 5, wherein said second planetary gearset includes a second sun gear, a plurality of second planet gears disposed in meshing relationship with said second sun gear, and a second carrier supporting said second planet gears; and wherein said second carrier rotates concurrently with said pinion when said dog clutch assembly is in said second position.

8. The electric drive unit as set forth in claim 7, wherein said first carrier of said first planetary gearset is integrally formed with said second sun gear of said second planetary gearset.

9. The electric drive unit as set forth in claim 1, wherein said differential has a ring supported in rotational communication with said pinion.

10. The electric drive unit as set forth in claim 9, wherein said ring and said pinion define a differential reduction gear ratio, said first planetary gearset defines a first reduction gear ratio, and said second planetary gearset defines a second gear reduction ratio; and wherein said first predetermined drive ratio is equal to the product of said differential reduction gear ratio and said first reduction gear ratio; and said second predetermined drive ratio is equal to the product of said differential reduction gear ratio, said first reduction gear ratio, and said second reduction gear ratio.

11. The electric drive unit as set forth in claim 10, wherein said first reduction gear ratio is equal to said second reduction gear ratio.

12. A powertrain system comprising:
a first driveline having a first pair of wheels;
a second driveline having a second pair of wheels;
a primary propulsion system that acts to generate and translate a first rotational torque only to said first pair of wheels of said first driveline;
an auxiliary propulsion system that acts to generate and translate a second rotational torque only to said second pair of wheels of said second driveline, said auxiliary propulsion system including an electric drive unit having:
an electric motor that acts to selectively generate a third rotational torque;
a pinion disposed in selective rotational communication with said electric motor;
a differential interposed in torque translating relationship between said pinion and said second pair of wheels for splitting a fourth rotational torque between said pinion and said second pair of wheels;
a first planetary gearset disposed in selective torque translating relationship between said electric motor and said pinion;
a second planetary gearset disposed in selective torque translating relationship between said first planetary gearset and said pinion; and
a dog clutch assembly interposed in torque translating relationship between said pinion and said first planetary gearset and said second planetary gearset, wherein said dog clutch assembly is movable between a first position wherein the third rotational torque from said electric motor is translated through said first planetary gearset and said dog clutch assembly to said pinion so as to drive said second pair of wheels at a first predetermined drive ratio, and a second position wherein the third rotational torque from said electric motor is translated through both of said planetary gearsets and said dog clutch assembly to said pinion so as to drive said second pair of wheels at a second predetermined drive ratio.

13. The powertrain system as set forth in claim 12, wherein said auxiliary propulsion system includes a battery in electrical communication with said electric motor of said electric drive unit.

14. The powertrain system as set forth in claim 12, wherein said primary propulsion system includes an internal combustion engine.

15. The powertrain system as set forth in claim 12, wherein said primary propulsion system is further defined as another electric drive unit.

\* \* \* \* \*